Patented Oct. 30, 1945

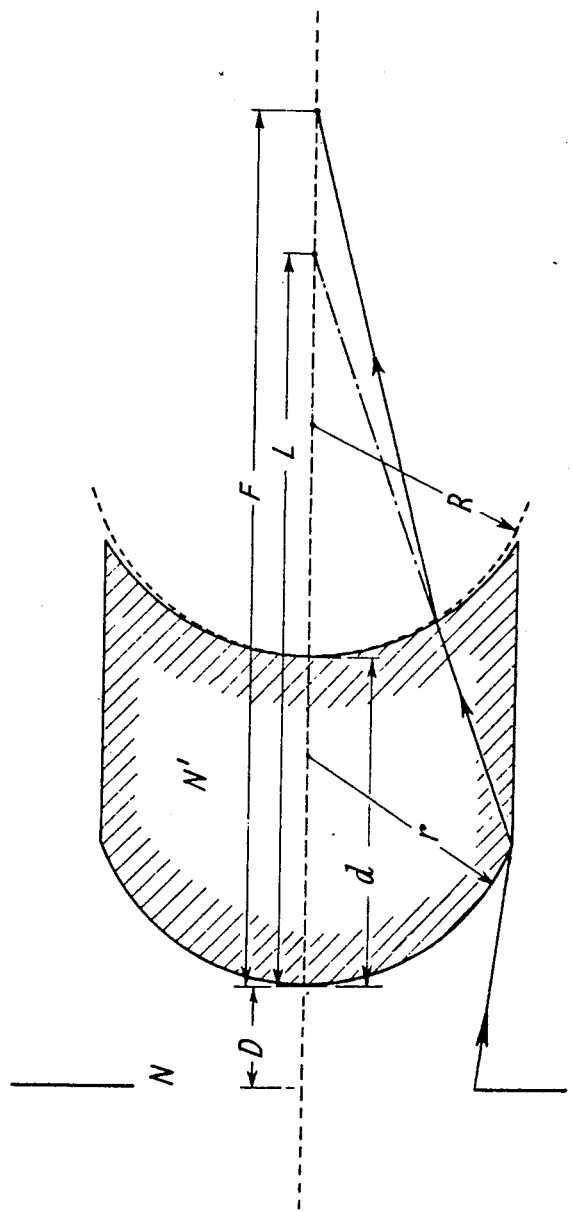

2,388,119

UNITED STATES PATENT OFFICE 2,388,119

LENS

Cecil Reginald Burch, Nailsea, Bristol, England, assignor to Metropolitan-Vickers Electrical Company Limited, London, England, a company of Great Britain Application September 14, 1943, Serial No. 502,364
In Great Britain September 18, 1942

5 Claims. (Cl. 88—57)

This invention relates to the manufacture of lenses which are required to be flat-fielded and of low residual astigmatism in the extended paraxial region. The paraxial region, as commonly understood, is that region within which the square of the angles, in radians, made by rays with the optical axis and/or the normals of the refracting surface is negligible as compared with unity, and the extended paraxial region is defined as that region throughout which terms of higher order in the aforesaid angles than the fourth in the expression for aberrations of the wave-front may be neglected. The invention is concerned essentially with lenses composed of only one piece of glass, or equivalent material, that is, singlet lenses.

According to the specification of U. S. application Serial No. 502,363, filed of even date herewith, for a lens having a first surface of paraxial radius of curvature denoted by the term $r$, a second surface of paraxial radius of curvature denoted by the term $R$ (both $r$ and $R$ being positive if the convexities face the incident light, an axial thickness $d$ and refractive index $N'$, and where the medium in which the lens is immersed has a refractive index of $N$, and the paraxial image (real or virtual) of an object surface is formed at distance denoted by the term $L$ in the material of the lens downlight from the first ($r$) surface, then said lens will be substantially anastigmatic in the extended paraxial region for an object surface located at a given distance ($U$) in front of the first surface of the lens, $U$ being related to $L$ by the known equation:

$$\frac{N'}{L}+\frac{N}{U}=\frac{N'-N}{r}$$

if the lens is constructed so that the values of $r$, $R$, $N$, $N'$, $L$ and $d$, are approximately such as mutually to satisfy the condition:

$$\frac{L}{r}\left[\frac{L}{r}-\left(1+\frac{N}{N'}\right)\right](r-d)=\frac{L-d}{R}\left[\frac{L-d}{R}-\left(1+\frac{N}{N'}\right)\right](R+d)$$

(which expression is referred to in the aforesaid specification as the expression or condition for anastigmatism of an aplanatic singlet) and if the lens is aspherised on its front and/or back surface(s) so as to eliminate both simple spherical aberration and primary coma.

For the lense also to be flat-fielded, $R$ must be equal to $r$ and then the equation may be written:

$$\frac{L}{r}\left[\frac{L}{r}-\left(1+\frac{N}{N'}\right)\right](r-d)=\frac{L-d}{r}\left[\frac{L-d}{r}-\left(1+\frac{N}{N'}\right)\right](r+d)$$

this equation being herein referred to, for convenience, as the condition for anastigmatism of a flat-fielded aplanatic singlet.

Investigation shows that the above mathematical condition for anastigmatism with flat field cannot, in fact, be satisfied in circumstances where $n$, that is $$\frac{N'}{N}$$

<1.602 and the object surface is located at infinity, as will be the case, for instance, for lenses used in landscape and ordinary photographic work as distinct from copying work.

Regarding the operation of figuring or aspherising the surfaces of a lens system so as to eliminate simple spherical aberration and primary coma, it is known that, if asphericity proportional to the fourth power of zonal radius is added to one surface of a lens system and asphericity also proportional to the fourth power of zonal radius and equal in numerical magnitude but opposite in sign, is added to a corresponding portion of a second surface of the lens system, primary coma is changed and simple spherical aberration is left unaffected (by corresponding portions of two surfaces is meant the portions through the peripheries of which will pass a set of rays also passing through the on-axis image point). The sign of the asphericities necessary to eliminate primary coma when a diaphragm is placed at the pole of one of the two surfaces in question, may be derived from consideration of the offence against the sine condition. When these asphericities have been figured on the surfaces in question, and it has been verified that the lens system is well-corrected for coma in respect of a diaphragm at the pole of one of the surfaces, the spherical aberration may be removed by figuring a further asphericity on that surface alone.

However, whatever be the value of $n$, that is $$\frac{N'}{N}$$

circumstances may be such in some cases as to render it inconvenient or inexpedient to figure both front and back faces of a singlet lens with a view to providing the closest possible approach to anastigmatism compatible with flat-fieldedness.

The present invention in certain aspects may be regarded as an extension of the invention of U. S. Serial No. 502,363 aforesaid, and seeks to achieve, in limiting circumstances as above instanced, a singlet flat-fielded lens giving the most reasonable approximation to anastigmatism in the extended paraxial region, and to provide data or optical specifications for the determination of such lenses in manufacture.

It is recognised that, although in contradistinction with the manufacture of lenses as hereinafter set forth which involves making only one surface of the lens aspheric, it may, in general, be possible to attain a mathematically closer approximation to anastigmatism by a different choice of dimensions necessitating figuring on both front and back surfaces in accordance with the aforesaid specification, the approximation obtained in accordance with this invention may be sufficiently close for practical purposes as not to warrant the requirement for figuring on both faces.

The lens of the invention is illustrated in the single figure of the drawing.

The form of a singlet lens may be defined in terms of two parameters $x$, $y$ respectively and $n$, where $$x = \frac{d}{r}$$

$$y = \frac{L-d}{R}$$

and $n$ is equal to $$\frac{N'}{N}$$

or the ratio of the refractive index of the material of the lens to that of the medium in which it is disposed, and $d$, $r$ and $R$ have the significance previously set forth.

In accordance with the invention, a lens is caused to be flat-fielded and to have low residual astigmatism, when taking parallel light on the front ($r$) face, by constructing it so that it shall substantially satisfy the following conditions:

(a) The value of parameters $x$, $y$ and $n$ are interrelated by the expression:

$$y = 1 + \frac{1}{2n} \pm \sqrt{\frac{1}{4n^2} + \frac{1-x}{(n-1)^2[n-(n-1)x]}}$$

(this being the condition that the lens shall be coma-free if simple spherical aberration is removed by having only the back surface aspheric), (b) the values of $r$, $R$, $d$ and $n$ are interrelated by the expression:

$$\frac{(n-1)}{R}\left[\frac{(L-d)}{R} - \frac{(n+1)}{n}\right]\left[\frac{R+d-r}{r-L}\right] = \frac{n-1}{R}\left(\frac{R-r}{2nr}\right)$$

which expression is obtained by equating on the one hand the quantity which, when multiplied by the off-axis image distance, gives the negative astigmatic interfocal distance, with, on the other hand, the (positive) depth of Petzval surface (this being the condition that, for a lens corrected for spherical aberration by aspherising one surface only, the lens is flat-fielded if a diaphragm be imagined at the pole of the back face to constrain the principal ray of off-axis pencils of light to pass therethrough), (c) R is not equal to $r$ (this being a case included in the claim of the aforesaid specification, and (d) Spherical aberration is removed by aspherising the back face only and without changing the paraxial radius of curvature.

The significance of the symbols herein used, both as so far referred to and as referred to subsequently in this specification, will be appreciated by reference to the accompanying drawing which shows an axial section of a singlet lens the back surface only of which is shown as being aspheric and osculating the vertex of the spherical surface indicated in broken line.

The value of $n$ (the refractive index in air of the material of which the lens is to be constructed) will generally be known, as will also one of the dimensions $r$ (the radius of curvature of the front face), R (the radius of curvature of the back face), $d$ (the axial thickness); usually the value of $r$ will be given to the optician. In practising the invention, he will then derive, in accordance with the foregoing, corresponding values for the other two dimensions, for example, R and $d$. Having constructed the lens with the dimensions $r$, R and $d$ thereby obtained, he will aspherise the back (R) surface to such extent as to eliminate simple spherical aberration.

It being usual for the focal length F in particular units of length, inches or centimetres to be specified, rather than one of the dimensions $r$, R and $d$, the procedure will be for the optician to assign a number, generally unity, to one of the dimensions, say $r$, and to derive in accordance with the foregoing corresponding numbers for R and $d$. He will then obtain the corresponding focal number namely as given by:

$$\frac{R.r.}{(n-1)\left(R-r+d-\frac{d}{n}\right)}$$

and select as the length unit, inches or centimetres, to be assigned to the values $r$, R and $d$, that value for which the focal number has the given value F in the aforesaid particular length units.

The process of pitch-polishing as conducted in repeatable manner at the present day usually results in substantially spherical surfaces; the required degree of asphericity in the back surface will then be produced in the usual manner by figuring, that is achieving the required shape by polishing. It may well be that in the case of moulded lenses the process of moulding may produce a surface which is sufficiently aspheric for the purpose of view.

The lens may be tested for correction of simple spherical aberration and primary coma errors by any of the available methods, such for example as by the well-known knife-edge test or by the well-known method utilising a Twyman-Green interferometer.

Lenses according to this invention may be employed as photographic objectives with a colour filter restricting them, more or less, to the light of one colour. Alternatively, they may be achromatised transversely that is for image size, namely by the use of a diaphragm so arranged that the circles of confusion due to colours not in focus are substantially concentric with the corresponding image points of the colour that is in focus on the plate; since the lenses of this invention are necessarily well-corrected for simple spherical aberration and primary coma, the actual position of the diaphragm when the lens is in use will have no effect on the residual astigmatism or flatness of field, and accordingly the diaphragm can be placed at the point which results in annulment of the lateral colour error. Where such diaphragm is used, its position, expressed as being at a distance denoted by D in front of the pole of the front surface of the lens, is given by the expression:

$$D = \frac{rd[(n-1)R - nr + (n-1)d]}{[n.r - (n-1)d]^2 - R[n^2r - (n-1)^2d]}$$

As an example of the manner in which the invention may be carried into effect, let us consider the manufacture of a singlet lens which is to have a convex front surface of radius of curvature equal to one (in inches or other length units). Further I am informed that the lens is to be used in air and is to be made of glass or other material such that the refractive index has the arbitrary value of 1.525; that is to say, $r=1$ and $n=1.525$.

In designing my lens, it is necessary first to determine the order of magnitude of parameter $x$ which as hereinbefore stated is equal to $$\frac{d}{r}$$

the value for $d$ is obtained by solving the equation for the aforementioned condition for an astigmatism with flat field, namely:

$$\frac{L}{r}\left[\frac{L}{r} - (1+n)\right](r-d) = \frac{L-d}{r}\left[\frac{L-d}{r} - (1+n)\right](r+d)$$

In this equation, L is known, since it is determinable from the known relation $$L = \frac{n}{n-1} \cdot r$$

The equation above set forth has two solutions (which may be identical) and the range of parameter $x$ to be tentatively chosen should include them both; if there is no real solution of this equation then the value of $x$ chosen will be the real part of the exact solution of the equation. Applying this procedure to the present example, namely, where $n=1.525$, $r=1$ and $$L = \frac{1.525}{0.525}$$

we decide that the range of $x$ to be tentatively chosen should be from 0 to 1.0291753.

We now proceed to obtain the values of R for the range of $x$ above mentioned, from the considerations that:

$$y = 1 + \frac{1}{2n} \pm \sqrt{\frac{1}{4n^2} + \frac{1-x}{(n-1)^2[n-(n-1)x]}}$$

$$y = \frac{L-d}{R}$$

$$L = \frac{n}{n-1} \cdot r$$

and $r=1$, while $n=1.525$.

There are two values R for each value of $x$, and the corresponding values of R for each value of $x$ are given in the columns headed $R_1$ and $R_2$ of the following table thereby derived:

Table I

| $x$ | $R_1$ | $R_2$ |
|---|---|---|
| 0.0 | 1.000 | −11.665 |
| 0.05 | 0.991 | −12.764 |
| 0.1 | 0.983 | −14.274 |
| 0.15 | 0.975 | −16.326 |
| 0.2 | 0.967 | −19.025 |
| 0.25 | 0.960 | −24.730 |
| 0.3 | 0.954 | −35.299 |
| 0.35 | 0.948 | −67.125 |
| 0.4 | 0.943 | +20.873 |
| 0.45 | 0.938 | +59.784 |
| 0.5 | 0.935 | −28.244 |
| 0.55 | 0.933 | 17.729 |
| 0.6 | 0.932 | 12.479 |
| 0.65 | 0.933 | 9.337 |
| 0.7 | 0.937 | 7.247 |
| 0.75 | 0.944 | 5.756 |
| 0.8 | 0.955 | 4.639 |
| 0.85 | 0.973 | 3.766 |
| 0.9 | 1.002 | 3.058 |
| 0.95 | 1.056 | 2.429 |
| 1.0 | 1.150 | 1.9 |
| 1.0291753 | 1.412478 | 1.412478 |

Since the column of the table which is headed $R_1$ includes values more nearly approaching unity, this column is the one chosen for further consideration, it being recognised that the value of R for the lens being designed is likely to be included in the range covered by this column, for the reason that a value of R within the range covered by the column headed $R_2$ is unlikely to have low residual astigmatism.

For each value of $x$ and the corresponding value of R given in the column headed $R_1$ in Table I, a calculation is made to derive the corresponding coefficient of astigmatism, namely the number which when multiplied by the square of the off-axis angle gives the negative astigmatic interfocal distance; this coefficient for a singlet aplanatisable, that is which can be corrected for spherical aberration, by figuring the back surface only is given by:

$$\frac{(n-1)}{R}\left[\frac{L-d}{R} - \frac{(n+1)}{n}\right]\left[\frac{R+d-r}{r-L}\right]F^2$$

where F denotes the focal length of the lens, and be it noted, whether or not $$L = \frac{n}{n-1} \cdot r$$

(that is, irrespective of whether or not the object is at infinity). Also for each of these values of $x$ and R, and for the case where $n=1.525$, a calculation is made to obtain the corresponding values for the curvature of field of the lens, namely, in accordance with the Seidel theory (as referred to in Conrady's "Applied Optical Design" and especially the section on "Seidel aberrations") the curve of surface of best definition for a diaphragm placed at the pole of the back face of the lens to constrain the principal ray of off-axis pencils of light to pass therethrough; the values for the curvature of field are given in terms of the coefficient of Petzval depth, namely the number which multiplied by the square of the off-axis angle gives the depth of Petzval surface, this coefficient being given by:

$$\frac{n-1}{2n}\left[\frac{R-r}{Rr}\right]F^2$$

where F denotes the focal length of the lens and is given by:

$$\frac{Rr}{(n-1)\left(R-r+\left(\frac{n-1}{n}\right)d\right)}$$

The aforesaid values for the coefficient of residual astigmatism and for the coefficient of Petzval depth are given in the following table:

Table II

| $x$ | $R^1$ | Coefficient of residual astigmatism | Coefficient of Petzval depth |
|---|---|---|---|
| 0.8 | 0.955 | 0.119 | −0.007 |
| 0.85 | 0.973 | 0.106 | −0.004 |
| 0.9 | 1.002 | 0.085 | +0.0003 |
| 0.95 | 1.056 | 0.048 | +0.009 |
| 1.0 | 1.150 | 0.0000 | +0.022 |
| 1.0291753 | 1.412478 | −0.9363 | +0.050268 |

We now have, as particularised in Table II, a series of lenses each defined exactly in terms of parameter $x$ and which we know will be corrected for primary coma if spherical aberration is removed by figuring on the back face only, and we can proceed to select that one lens which is flat-fielded. This may be done graphically, namely by plotting a curve with values of $x$ as abscissae and the corresponding values for the coefficient of residual astigmatism as ordinates, and a curve with similar abscissae but with values of the coefficient of Petzval depth as ordinates; the point of intersection of these curves gives the value of $x$ for which the residual astigmatism is sufficiently low according to the present invention and for which the lens will have a flat field. The value of $x$ for the lens being designed is thus found to be about 0.98 namely for which the coefficients of residual astigmatism and Petzval depth have the value of about 0.017; the corresponding value of R, obtained from Table II, is found to be 1.1 approximately, the value for $d$ being equal to 0.98 for the corresponding value of $r$, namely unity.

Thus, the extended paraxial design is satisfied by the instructions (a) to grind the front face of a block of glass or other material having the refractive index of 1.525, to unit radius convex, (b) to grind the back face concave on a radius of curvature of 1.10 units and at distance slightly exceeding 0.98 unit from the front face so that the finished thickness after figuring may be 0.98 unit, (c) to figure the back face of the lens to such extent as to remove simple spherical aberration, without changing the paraxial radius of curvature thereof.

Instead of proceeding in accordance with the manufacturing steps (b) and (c) above, the optician may prefer to grind the back face to a somewhat shorter radius of curvature, so that the required paraxial curvature may be attained by a figuring operation in which substantially no material is removed from the centre or rim of the back face, the maximum depth being removed at a zonal radius which is approximately $$\frac{1}{\sqrt{2}}$$

times the radius of the edge of the back face. The contribution to the necessary depth of figuring on the back face, associable with, and equilibrating, the spherical aberration due to refraction at the front surface is of zonal height denoted by H and is given by adding to the lens a thickness of the material of the lens which is equal to:

$$\frac{H^4}{8r^3} \cdot n^2 \cdot \frac{L^2(L-r)^2}{(L-d)^4} \left[ \frac{L - \left(\frac{n+1}{n}\right)r}{L} \right]$$

The contribution to the necessary depth of figuring on the back face, associable with, and equilibrating the spherical aberration due to refraction at the back surface is given by adding at zonal height denoted by H a thickness of the material of the lens which is equal to:

$$\frac{-H^4}{8R^3} \cdot n^2 \cdot \frac{(R+d-L)^2}{(L-d)^2} \left[ \frac{(L-d) - \left(\frac{n+1}{n}\right)R}{(L-d)} \right]$$

These two contributions then give, if H is set at a value equal to the edge radius of the back face, the excess of thickness that must be allowed over and above 0.98 unit in the numerical example above referred to in order that the finished thickness, in case the lens has been ground to a radius of curvature of 1.10 units on the back face before figuring, shall be 0.98 unit. In the aforesaid numerical example, the two contributions total roughly 0.25 $H^4$; if then we set $H_{max}=\frac{1}{2}$, we shall require an increment of thickness of approximately $\frac{1}{64}$ unit above the value of 0.98 unit—say a total thickness of 0.993 unit in case the back face is ground to radius of curvature of 1.10 units before figuring; alternatively, if the back face is ground to a radius of curvature of 0.98 unit before figuring, we should set $R=1.1-\delta R$ where $$\frac{H^4 \delta R}{2R^2} = \frac{1}{64} \text{ or } \delta R = 0.15$$

that is to say the back face should be ground to a radius of curvature of 0.095 unit approximately if it is then to be figured in such manner that substantially no material is removed from the centre or edge of the back face and the required paraxial radius of curvature of 1.10 units finally obtained.

Provided that the foregoing instructions are complied with, it is known that the resultant lens will be coma-free and flat-fielded and will have low residual astigmatism in the extended paraxial region.

Further, the lens will be free from transverse chromatism if used with a diaphragm the centre of which is located at a distance denoted by D in front of the front surface of the lens, to be derived from the expression:

$$D = \frac{rd[(n-1)R - nr + (n-1)d]}{[nr-(n-1)d]^2 - R[n^2r-(n-1)^2d]}$$

For the values of $n=1.525$, $r=1$, $R=1.1$, and $d=0.98$ unit, the corresponding value of $D=0.342$ unit.

It will be appreciated that the invention, as well as enabling the economic production of flat-fielded anastigmats of glass as commonly known, is eminently suited for the manufacture of such lenses from other materials such for example as moulded lenses composed of the so-called plastic glass.

I claim:

1. A singlet lens having a flat field and low residual astigmatism in the extended paraxial region when taking parallel light on the front face, composed of a transparent material having a refractive index N', and having substantially spherical front and back surfaces of radii of curvature $r$ and R respectively which are positive for convexities facing the incident light, and an axial thickness $d$ in such dimensional relation that, for a given value $n$ denoting the ratio N'/N between the refractive index of the material of the lens and that of the medium in which the lens is to be used, $$y = 1 + \frac{1}{2n} \pm \sqrt{\frac{1}{4n^2} + \frac{1-x}{(n-1)^2 n - (n-1)x}}$$

wherein $$x = \frac{d}{r}, \quad y = \frac{L-d}{R}$$

and L, which represents the distance of the paraxial center of the image behind the front surface of the lens is equal to $$\frac{n}{n-1} \cdot r$$

and the dimensions $r$, $R$ and $d$ for the value $n$ are further related by the expression:

$$\frac{n-1}{R}\left[\frac{(L-d)}{R} - \frac{(n+1)}{n}\right]\left[\frac{R+d-r}{r-L}\right] = \frac{(n-1)}{R}\left(\frac{R-r}{2n.r}\right)$$

the back surface only of the lens being aspherised to remove simple spherical aberration without changing the paraxial radius of curvature thereof.

2. A singlet lens as defined in claim 1, in combination with a centrally apertured diaphragm having its center at a distance represented by D in front of the pole of the front surface of the lens, the dimension of D being:

$$\frac{r.d[(n-1)R - n.r + (n-1)d]}{[n.r - (n-1)d]^2 - R[n^2r - (n-1)^2 d]}$$

3. The method of making a flat-fielded singlet lens having low residual astigmatism in the extended paraxial region when taking parallel light on the front face in a medium of refractive index N, comprising forming transparent material of refractive index N' into a single lens element having an axial thickness $d$ and substantially spherical front and back surfaces of radii $r$ and R, respectively, in such proportion that $$y = 1 + \frac{1}{2n} \pm \sqrt{\frac{1}{4n^2} + \frac{1-x}{(n-1)^2[n-(n-1)x]}}$$

where $$n = \frac{N'}{N}$$

$x$ is a parameter equal to $$\frac{d}{r}$$

$y$ is a parameter equal to $$\frac{L-d}{R}$$

and L, the distance behind the front surface at which is located the paraxial center of the image, is equal to $$\frac{nr}{n-1}$$

and the relative dimensions $r$, $R$, $d$ and $n$ are further related by the expression $$\frac{n-1}{R}\left[\frac{L-d}{R} - \frac{n+1}{n}\right]\left[\frac{R+d-r}{r-L}\right] = \frac{n-1}{R}\left(\frac{R-r}{2nr}\right)$$

and then aspherising the back surface only of said lens element to correct for simple spherical aberration without changing the paraxial radius of curvature thereof.

4. In the method of making a flat-fielded singlet lens defined in claim 3, said lens element as formed having its axial thickness and the radii of curvature of both front and back surfaces so dimensioned as to provide a lens element containing sufficient added material at said back surface to offset spherical aberration due to refraction at both front and back surfaces of the lens, and said back surface is figured by removal of material only at the center and rim of said back surface to correct simple spherical aberration.

5. A singlet lens of given focal length F as defined in claim 1 wherein $$F = \frac{Rr}{(n-1)\left(R - r + d - \frac{d}{n}\right)}$$

CECIL REGINALD BURCH.